UNITED STATES PATENT OFFICE.

ANTON F. GLOGER, JR., AND JOSEPH P. GLOGER, OF COLUMBUS, TEXAS.

COMPOSITION FOR STAINING WOOD.

SPECIFICATION forming part of Letters Patent No. 258,050, dated May 16, 1882.

Application filed July 11, 1881. Renewed March 24, 1882. (No specimens.)

*To all whom it may concern:*

Be it known that we, ANTON F. GLOGER, Jr., and JOSEPH P. GLOGER, citizens of the United States, residing at Columbus, in the county of Colorado and State of Texas, have invented certain new and useful Improvements in Compositions for Staining Wood; and we do hereby declare the following to be a full, clear, and exact description of the invention, such as will enable others skilled in the art to which it appertains to make and use the same.

Our invention relates to the combination of certain well-known ingredients in such proportion and in such a manner as to produce a paint or stain, which, when applied, will harden on the common woods of commerce, render them durable and smooth, and give them the exact appearance of black walnut, so that by using our composition, which will cost only a nominal sum of money, a piece of furniture—a bureau, for instance, made of pine or poplar—will be made as durable and elegant in appearance as if made of black walnut.

This composition is constituted as follows: Take one gallon of water, three-quarters of a pound of Vandyke brown, one-half pound of carbonate of soda, or sal-soda, one ounce of sugar of lead, and one-half ounce of permanganate of potash. Boil the water and the Vandyke brown for thirty minutes, and then put in the carbonate of soda and the sugar of lead, and it will at once effervesce, owing to the mixture, and a compound composed of Vandyke brown, water, carbonate of soda, acetate of soda, and oxide of lead will be formed. Then put in the permanganate of potash, and the combination is ready for use as soon as cool.

The different shades necessary to produce the peculiar appearance of black walnut are made by manipulating the brush in putting the stain or paint on the wood. This imitation of the color and semblance of black walnut can be easily effected by any ordinary painter, a single coat generally proving sufficient to give the desired color. When dry, varnish with the ordinary furniture-varnish or with boiled linseed-oil.

What we claim as new, and desire to secure by Letters Patent, is—

The herein-described stain, composed of water, Vandyke brown, carbonate of soda, acetate of soda, oxide of lead, and permanganate of potash, in the proportions set forth.

In testimony whereof we have affixed our signatures in presence of two witnesses.

ANTON F. GLOGER, JR.
JOSEPH P. GLOGER.

Witnesses:
L. WEETE,
EDMOND C. KLEIN.